(12) United States Patent
Gupta

(10) Patent No.: US 8,867,139 B2
(45) Date of Patent: Oct. 21, 2014

(54) DUAL AXIS INTERNAL OPTICAL BEAM TILT FOR EYEPIECE OF AN HMD

(71) Applicant: Google Inc., Mountain View, CA (US)

(72) Inventor: Anurag Gupta, Los Gatos, CA (US)

(73) Assignee: Google Inc., Mountain View, CA (US)

(*) Notice: Subject to any disclaimer, the term of this patent is extended or adjusted under 35 U.S.C. 154(b) by 97 days.

(21) Appl. No.: 13/714,171

(22) Filed: Dec. 13, 2012

(65) Prior Publication Data

US 2014/0153103 A1  Jun. 5, 2014

Related U.S. Application Data

(60) Provisional application No. 61/732,018, filed on Nov. 30, 2012.

(51) Int. Cl.
   *G02B 27/14* (2006.01)
   *G02B 27/01* (2006.01)
   *G02B 5/30* (2006.01)

(52) U.S. Cl.
   CPC .... *G02B 27/0172* (2013.01); *G02B 2027/0123* (2013.01); *G02B 2027/0121* (2013.01); *G02B 5/30* (2013.01); *G02B 27/017* (2013.01); *G02B 2027/0178* (2013.01)
   USPC ................................ 359/631; 359/633; 345/8

(58) Field of Classification Search
   CPC ............................ G02B 27/017; G02B 27/0172
   USPC ............................ 359/630, 632, 631; 345/8–9
   See application file for complete search history.

(56) References Cited

U.S. PATENT DOCUMENTS

| 4,711,512 A | 12/1987 | Upatnieks |
| 5,076,664 A | 12/1991 | Migozzi |

(Continued)

FOREIGN PATENT DOCUMENTS

| EP | 1 300 716 A1 | 4/2003 |
| GB | 2 272 980 A | 6/1994 |

(Continued)

OTHER PUBLICATIONS

PCT/US2013/029668; PCT International Search Report and Written Opinion of the International Searching Authority, mailed Jun. 4, 2013, 7 pages.

(Continued)

*Primary Examiner* — Alicia M Harrington
*Assistant Examiner* — Marin Pichler
(74) *Attorney, Agent, or Firm* — Blakely Sokoloff Taylor & Zafman LLP

(57) ABSTRACT

An eyepiece includes a display module for providing display light, a concave end reflector, and a viewing region including a partially reflective surface to redirect at least a portion of the display light out of an eye-ward side of the eyepiece along an emission path. The partially reflective surface is obliquely angled with an offset from 45 degrees relative to the eye-ward side to cause the emission path to have a first oblique angle in a horizontal dimension relative to a first normal vector of the eye-ward side. The concave end reflector is tilted such that a second normal vector from a center point of the concave end reflector is obliquely angled relative to a top or bottom surface of the eyepiece to cause the emission path to have a second oblique angle in a vertical dimension relative to the first normal vector of the eye-ward side.

20 Claims, 7 Drawing Sheets

(56) References Cited

U.S. PATENT DOCUMENTS

| | | |
|---|---|---|
| 5,093,567 A | 3/1992 | Staveley |
| 5,539,422 A | 7/1996 | Heacock et al. |
| 5,539,578 A * | 7/1996 | Togino et al. ............. 359/630 |
| 5,696,521 A | 12/1997 | Robinson et al. |
| 5,708,529 A | 1/1998 | Togino et al. |
| 5,715,337 A | 2/1998 | Spitzer et al. |
| 5,771,124 A | 6/1998 | Kintz et al. |
| 5,815,126 A | 9/1998 | Fan et al. |
| 5,844,530 A | 12/1998 | Tosaki |
| 5,886,822 A | 3/1999 | Spitzer |
| 5,896,232 A | 4/1999 | Budd et al. |
| 5,926,318 A | 7/1999 | Hebert |
| 5,943,171 A | 8/1999 | Budd et al. |
| 5,949,583 A | 9/1999 | Rallison et al. |
| 6,023,372 A | 2/2000 | Spitzer et al. |
| 6,091,546 A | 7/2000 | Spitzer |
| 6,172,657 B1 | 1/2001 | Kamakura et al. |
| 6,201,629 B1 | 3/2001 | McClelland et al. |
| 6,204,974 B1 | 3/2001 | Spitzer |
| 6,222,677 B1 | 4/2001 | Budd et al. |
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,396,639 B1 * | 5/2002 | Togino et al. ............. 359/630 |
| 6,538,799 B2 | 3/2003 | McClelland et al. |
| 6,618,099 B1 | 9/2003 | Spitzer |
| 6,671,100 B1 | 12/2003 | McRuer |
| 6,690,516 B2 | 2/2004 | Aritake et al. |
| 6,701,038 B2 | 3/2004 | Rensing et al. |
| 6,724,354 B1 | 4/2004 | Spitzer et al. |
| 6,738,535 B2 | 5/2004 | Kanevsky et al. |
| 6,747,611 B1 * | 6/2004 | Budd et al. ............. 345/7 |
| 6,829,095 B2 | 12/2004 | Amitai |
| 6,864,861 B2 | 3/2005 | Schehrer et al. |
| 6,879,443 B2 | 4/2005 | Spitzer et al. |
| 7,158,096 B1 | 1/2007 | Spitzer |
| 7,242,527 B2 | 7/2007 | Spitzer et al. |
| 7,253,960 B2 * | 8/2007 | Yamazaki et al. ............. 359/633 |
| 7,391,573 B2 | 6/2008 | Amitai |
| 7,457,040 B2 | 11/2008 | Amitai |
| 7,576,916 B2 | 8/2009 | Amitai |
| 7,577,326 B2 | 8/2009 | Amitai |
| 7,643,214 B2 | 1/2010 | Amitai |
| 7,663,805 B2 | 2/2010 | Zaloum et al. |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,843,403 B2 | 11/2010 | Spitzer |
| 7,900,068 B2 | 3/2011 | Weststrate et al. |
| 8,004,765 B2 | 8/2011 | Amitai |
| 2003/0090439 A1 | 5/2003 | Spitzer et al. |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2008/0219025 A1 | 9/2008 | Spitzer et al. |
| 2009/0122414 A1 | 5/2009 | Amitai |
| 2010/0046070 A1 | 2/2010 | Mukawa |
| 2010/0103078 A1 | 4/2010 | Mukawa et al. |
| 2010/0149073 A1 | 6/2010 | Chaum et al. |
| 2010/0278480 A1 | 11/2010 | Vasylyev |
| 2011/0019250 A1 * | 1/2011 | Aiki et al. ............. 359/15 |
| 2011/0213664 A1 | 9/2011 | Osterhout et al. |
| 2013/0242405 A1 | 9/2013 | Gupta |

FOREIGN PATENT DOCUMENTS

| | | |
|---|---|---|
| JP | 10-253919 A | 9/1998 |
| JP | 2000-214409 | 8/2000 |
| JP | 2002-014300 A | 1/2002 |
| WO | WO 96/05533 A1 | 2/1996 |
| WO | WO 97/25646 | 7/1997 |

OTHER PUBLICATIONS

U.S. Notice of Allowance mailed Mar. 26, 2014, U.S. Appl. No. 13/423,672, filed Mar. 19, 2012 (23 pages).

Levola, T., "Diffractive Optics for Virtual Reality Displays", Academic Dissertation, Joensuu 2005, University of Joensuu, Department of Physics, Vaisala Laboratory, 26 pages.

Mukawa, H. et al., "8.4: *Distinguished Paper*: A Full Color Eyewear Display using Holographic Planar Waveguides", SID Symposium Digest of Technical Papers, May 2008, vol. 39, Issue 1, pp. 89-92.

Gupta, A., "Optical Beam Tilt for Offset Head Mounted Display," U.S. Appl. No. 13/423,672, filed Mar. 19, 2012, 21 pages.

PCT/US2013/070145, International Search Report and Written Opinion, mailed Feb. 26, 2014, 13 pages.

* cited by examiner

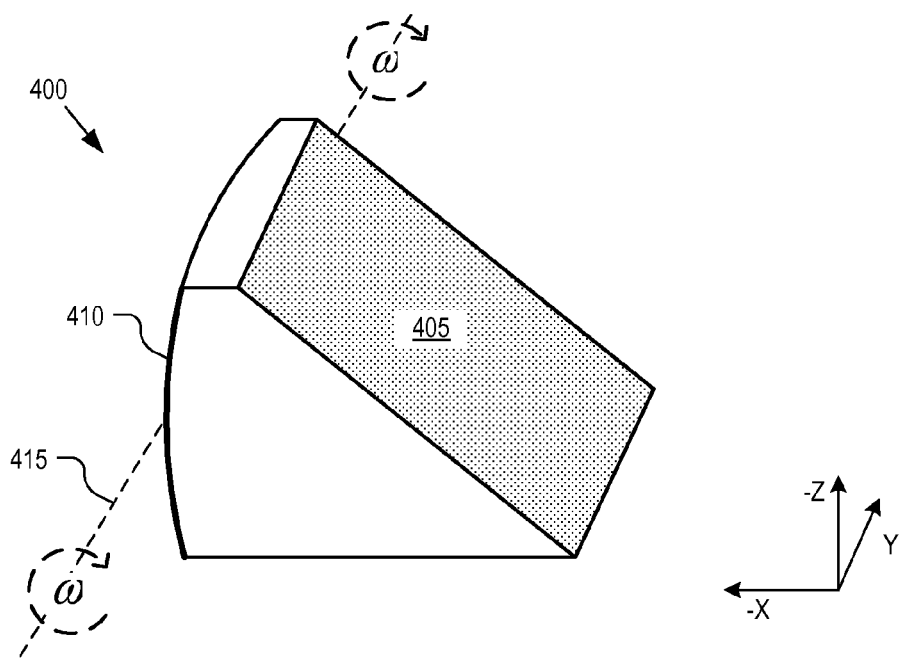
FIG. 4A
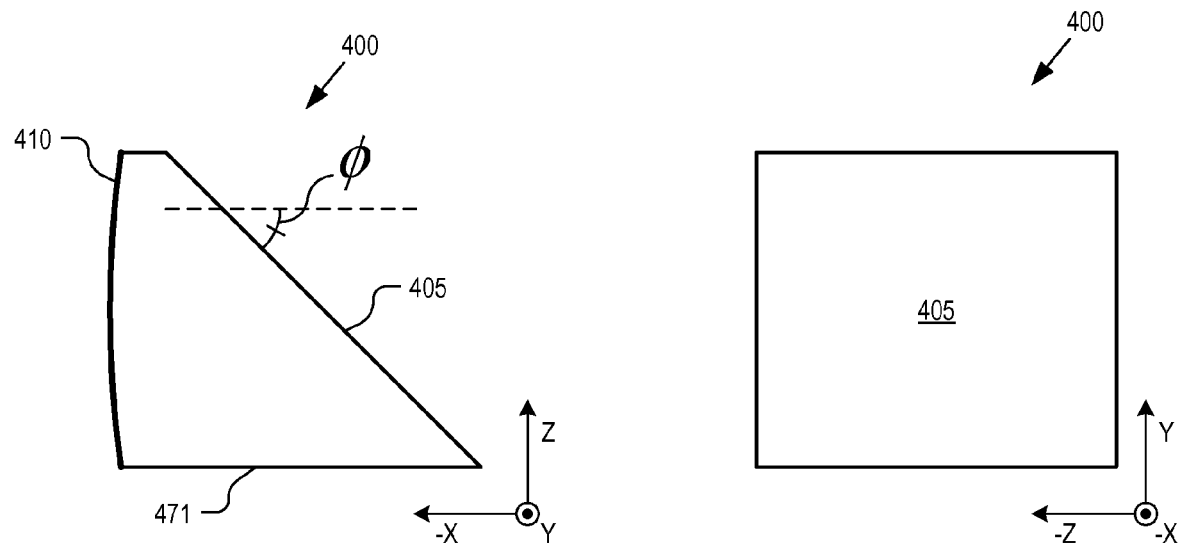
FIG. 4B                                FIG. 4C

DUAL AXIS INTERNAL OPTICAL BEAM TILT FOR EYEPIECE OF AN HMD

CROSS-REFERENCE TO RELATED APPLICATIONS

This application claims priority under the provisions of 35 U.S.C. §119(e) to U.S. Provisional Application No. 61/732,018, filed Nov. 30, 2012.

TECHNICAL FIELD

This disclosure relates generally to the field of optics, and in particular but not exclusively, relates to head mounted displays.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI") while blocking the user's external view. These HMD displays are often referred to as virtual reality ("VR") displays. Other HMDs are capable of superimposing CGI over a real-world view. This latter type of HMD can serve as the hardware platform for realizing augmented reality ("AR"). With AR the viewer's image of the world is augmented with an overlaying CGI. Another term used to refer to various types of HMDs is a heads-up display ("HUD"). A HUD is any display that permits the user to view a CGI without having to look down or otherwise taking their eyes significantly off their head up forward position. Both VR and AR HMDs can be implemented as HUDs.

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, limited field of view, small eyebox, or poor efficiency of conventional optical systems used to implement existing HMDs. In particular, conventional HMDs often restrict the users view of the external world, making them awkward to wear during regular daily activities.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

FIGS. 4A-C illustrate various views of a partially reflective surface and end reflector for reflecting display light out of an eyepiece along a dual tilted emission path, in accordance with an embodiment of the disclosure.

DETAILED DESCRIPTION

Embodiments of an apparatus, system, and method of operation of an eyepiece for a head mounted display ("HMD") that outputs display light along a tilted emission path that tilts in two dimensions are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
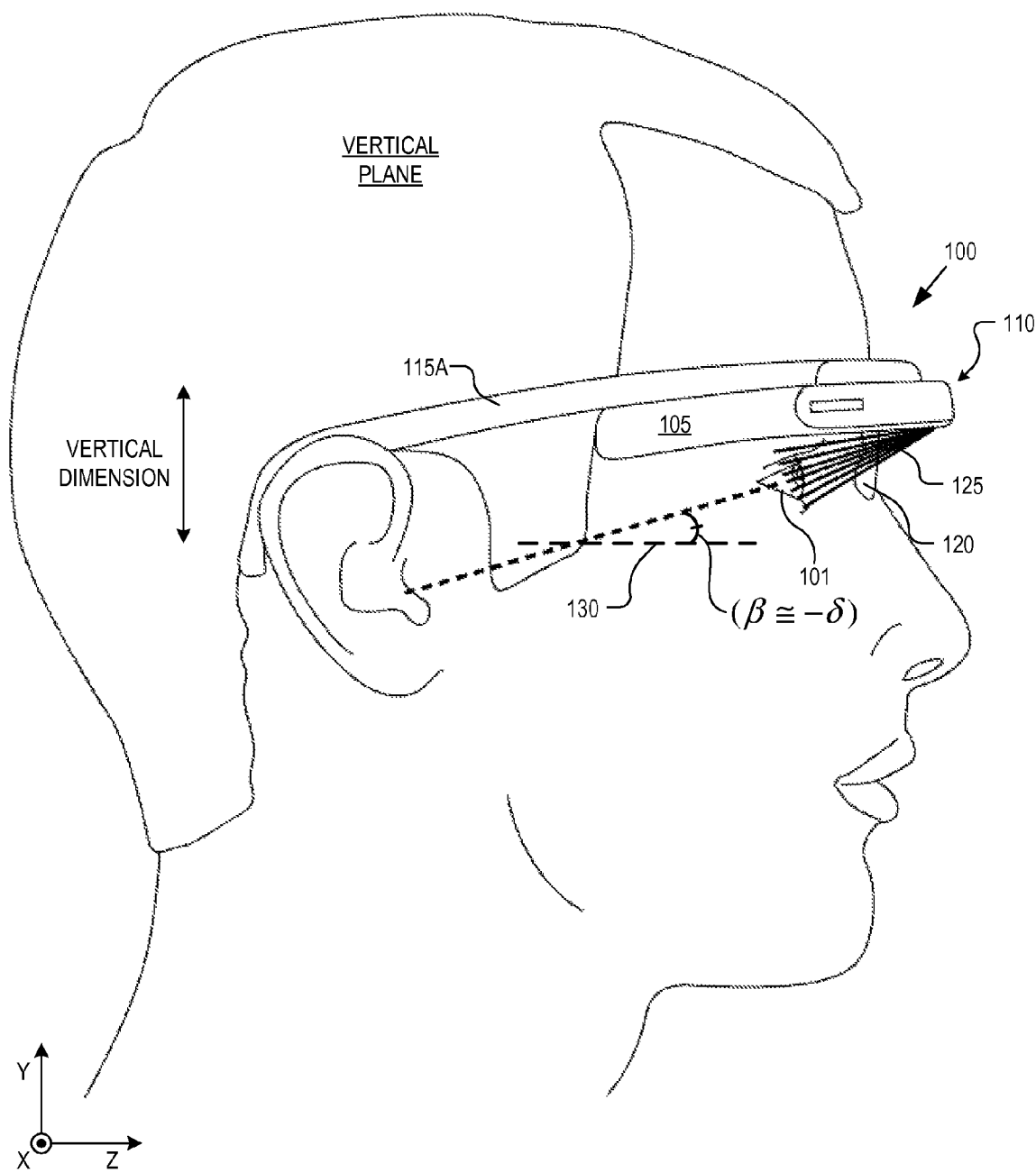
FIGS. 1A-C illustrate a head mounted display ("HMD") for wearing offset from a user's eyes, in accordance with an embodiment of the disclosure.
Figure 1B:
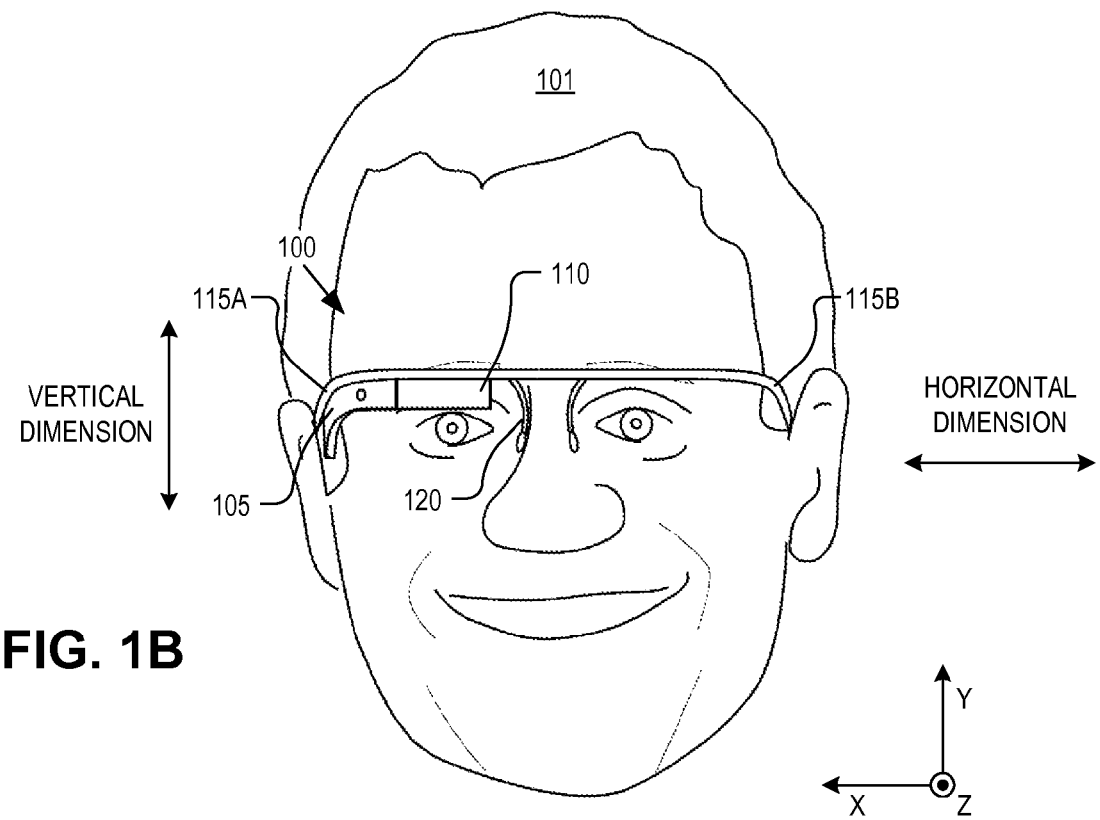
Figure 1C:
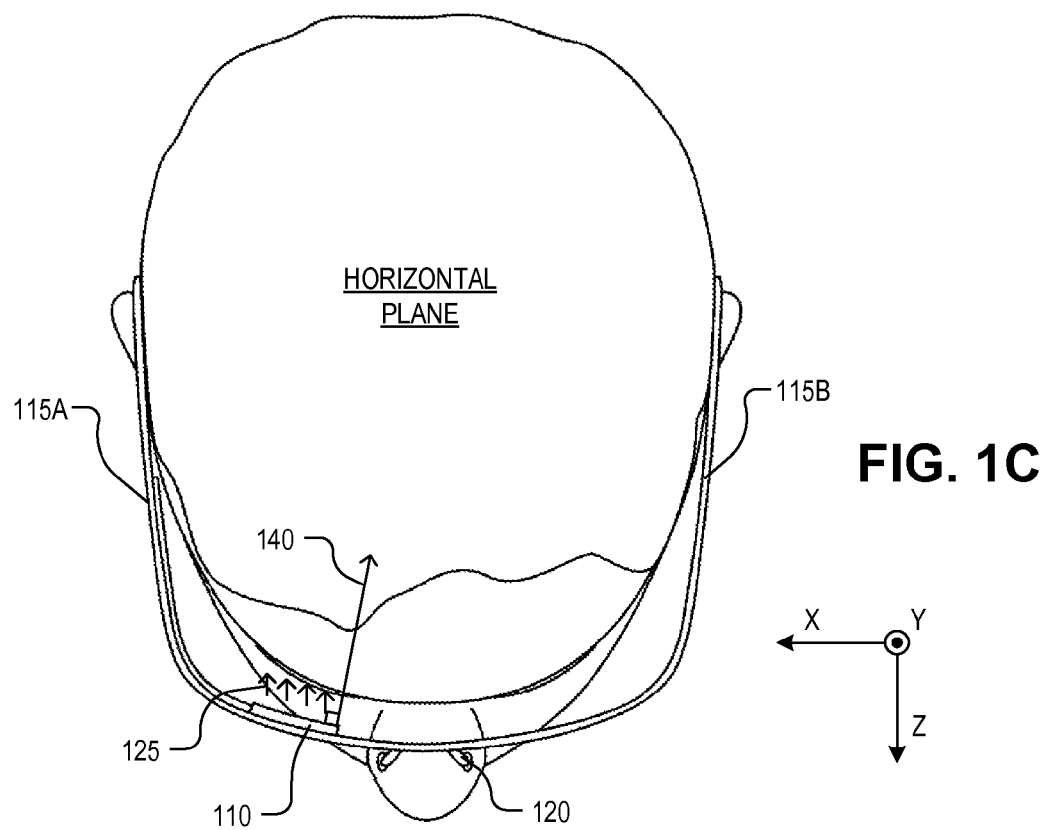

FIGS. 1A-C illustrate a head mounted display ("HMD") 100 that supports an eyepiece offset from a user's eye(s) 101 and emits display light along a tilted emission path that tilts in two dimensions, in accordance with an embodiment of the disclosure. The illustrated embodiment of HMD 100 includes an electronics housing 105 and eyepiece 110 supported on the head of the user by a frame assembly. The illustrated frame assembly includes a right ear arm 115A, left ear arm 115B, and a nose bridge 120. HMD 100 may be implemented as a monocular embodiment that includes a single eyepiece 110 for displaying display light 125 to a single eye 101 (illustrated) or a binocular embodiment that includes dual eyepieces 110 for displaying display light to both eyes (not illustrated).

Electronics housing 105 and eyepiece 110 are secured into an eyeglass arrangement that can be worn on the head of a user either above (illustrated) or below (not illustrated) the users eyes 101. The left and right ear arms rest over the user's ears while nose bridge 120 rests over the user's nose. The frame assembly is shaped and sized to position an eyepiece 110 in a near-to-eye configuration above (or below) the user's central forward vision. Of course, other frame assemblies having other shapes may be used (e.g., a single contiguous headset member, a headband, goggles type eyewear, etc.). By positioning eyepiece 110 above the user's eyes, HMD 100 does not constrain the lateral field of view ("FOV") of the user's forward vision. Eyepiece 110 is designed to emit display light 125 along an emission path that is tilted down towards the user's eye 101. The vertically tilted emission path is achieved by tilting an end reflector located at a distal end of eye piece 100 (discussed below). The external side surfaces of eyepiece 110 can maintain a vertical or near vertical position even though the emission path is angled down, thus improving the industrial design of HMD 100 and maintaining a pleasing aesthetics. To view display light 125, the user need only tilt their gaze upward by a gazing angle β above horizontal 130 (or downward in the cases of eyepiece 110 suspended below the eye) to align with the downward tilt angle δ of display light 125 emitted from eyepiece 110. In one embodiment, the frame assembly is designed to hold eyepiece 110 relative to eye 101, such that tilt angle δ=−7 degree±3 degrees will centrally position the image on eye 101 when the user lifts their gazing angle β by a corresponding angle. In other words, to view CGI light 101, β≅−δ.

As illustrated in FIG. 1C, eyepiece 110 is also mounted to the frame assembly such that its proximal end near electronics housing 105 is angled inward towards the user's temple (toes-in). In some embodiments, the proximal end of eyepiece 110 is hinged near the user's temple and the distal end of eyepiece 110 angles towards the user's eye. Again, this toeing-in configuration can improve the industrial design of HMD 100, since the eyepiece 110 more closely follows the contours of the user's head. In the illustrated embodiment, eyepiece 110 has a rectangular box shape with flat, planar top, bottom, eye-ward, and scene side surfaces. As such, the emission path of display light 125 is also obliquely angled in the horizontal plane relative to the normal vector 140 of the eye-ward side of eyepiece 110. By performing dual oblique angle bending internal to a rectangular box shape eyepiece, industrial design and aesthetics are improved along with eye safety. Eye safety is improved since an irregular shaped eyepiece is not positioned near the user's eye to achieve the oblique light bending along dual axes.

The illustrated embodiment of HMD 100 is capable of displaying a display image (e.g., computer generated image) to the user in the form of a heads up display ("HUD") without undue obstruction of their forward vision. In one embodiment, the viewing region of eyepiece 110 is partially transparent, which further permits the user to see the external real world through eyepiece 110 even when they look up. When looking up, display light 125 may be seen by the user as virtual images superimposed over the real world as an augmented reality. In some embodiments, eyepiece 110 may be opaque and block their upward external vision. Electronics housing 105 may house various electronic components for operation of HMD 100 such as a power supply, a graphics engine, a microprocessor, input/output circuitry, a wireless transceiver, memory, etc.

Figure 2A:
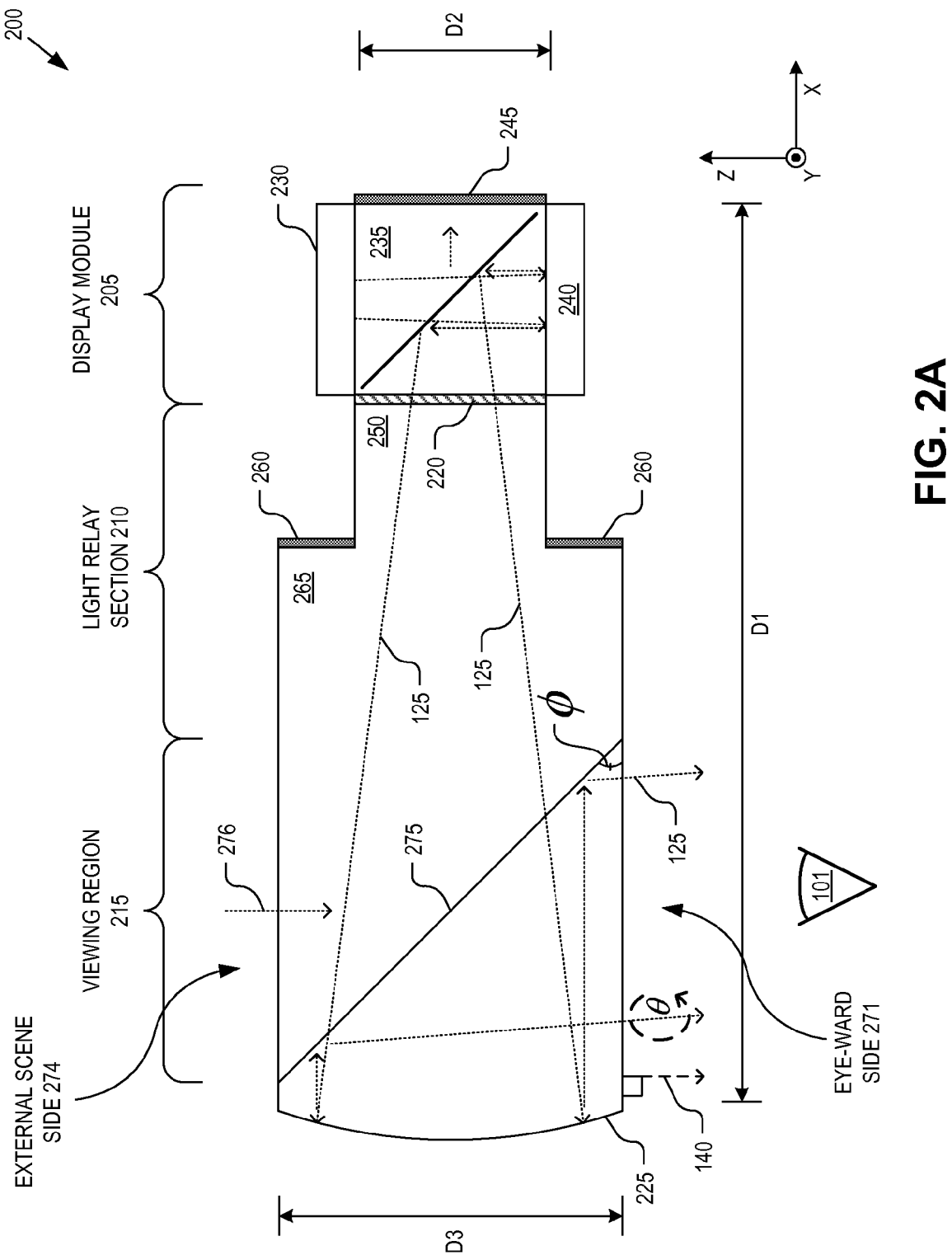
FIGS. 2A-C illustrate various side/cross-sectional views of an eyepiece for an HMD that outputs display light along a tilted emission path that tilts in two dimensions, in accordance with an embodiment of the disclosure.
Figure 2B:
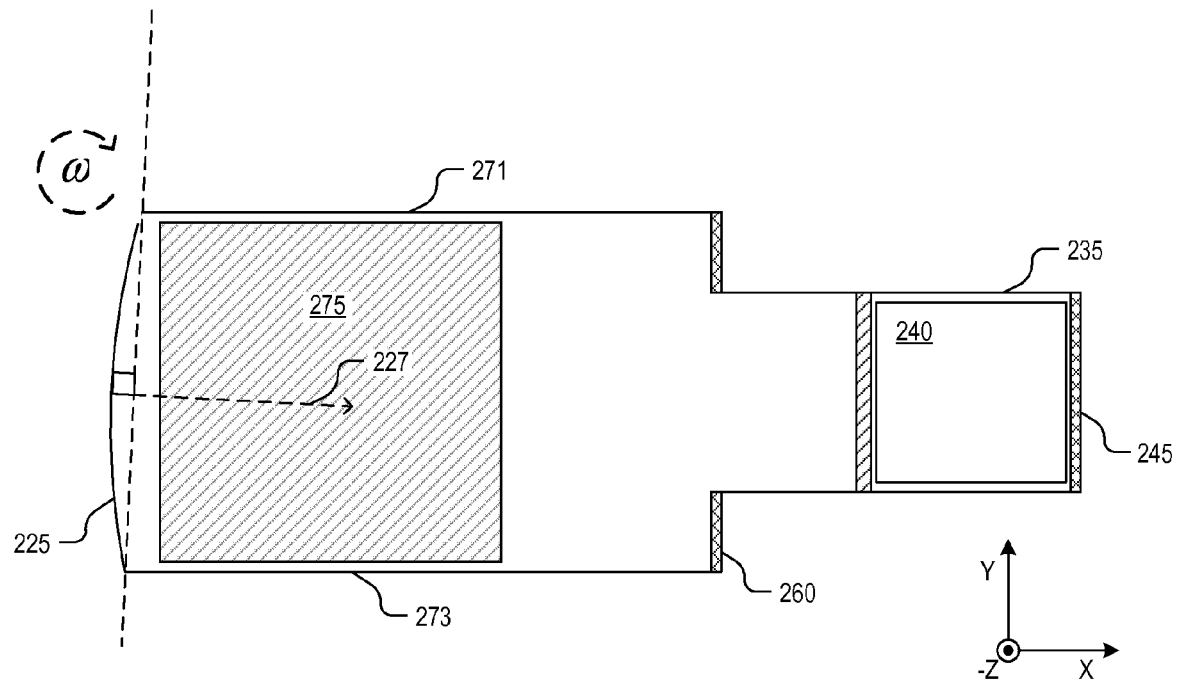
Figure 2C:
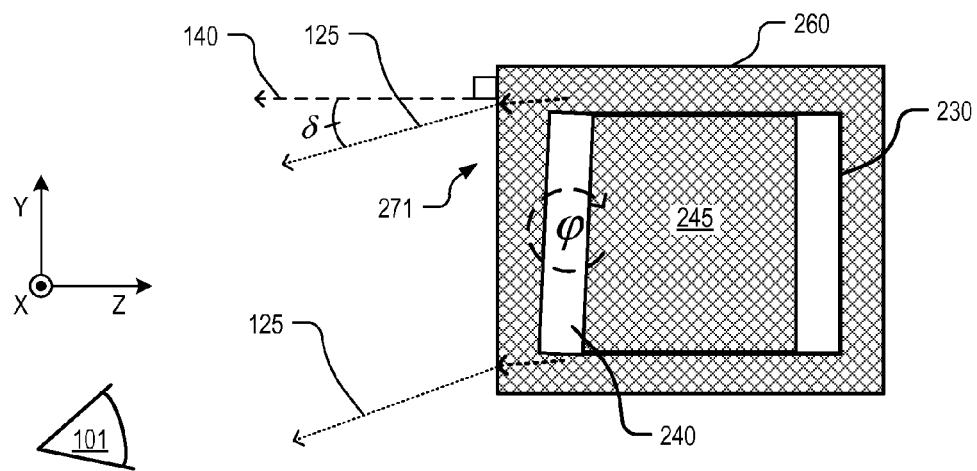

FIGS. 2A-C illustrate various side/cross-sectional views of an eyepiece 200 that outputs display light along a tilted emission path that tilts in two dimensions, in accordance with an embodiment of the disclosure. Eyepiece 200 is one possible implementation of eyepiece 110 illustrated in FIGS. 1A-C. The illustrated embodiment of eyepiece 200 includes a display module 205, a light relay section 210, a viewing region 215, and an end reflector 225. The illustrated embodiment of display module 205 includes a lamp source 230, an in-coupling beam splitter 235, a display panel 240, a light absorbing coating 245, and a linear polarizer 220. The illustrated embodiment of light relay section 210 includes a small section 250, light blocks 260, and large section 265. The illustrated embodiment of viewing region 215 is a see-through region with an out-coupling beam splitter having a partially reflective surface 275. Viewing region 215 includes an eye-ward side 271 for emission of display light 125 towards eye 101 and an external scene side 274 through which, in some embodiments, ambient light 276 may pass. In the illustrated embodiment, light relay section 210 and viewing region 215 are made of two pieces (e.g., plastic or glass pieces) mated together at oblique interfaces between which partially reflective surface 275 is disposed. While FIGS. 2A-2C illustrate an embodiment where the various sections of eyepiece 200 are cuboids with right-angled exterior sides, in other embodiments, one or more of the various sections of eyepiece 200 may have one or more non-right-angled exterior sides, such as a parallelogram.

In the illustrated embodiment, end reflector 225 is a concave mirror surface (e.g., metal coated surface) formed into the distal end of eyepiece 200. End reflector 225 is tilted or tipped by an angle ω (see FIG. 2B) such that its normal vector 227 extending from the center point of end reflector 225 does not run parallel to top surface 271 or bottom surface 273. In the illustrated embodiment, normal vector 227 points down for a HMD configuration where eyepiece 200 is positioned above eye 101. For an emission path of display light 125 that is obliquely angled down in the vertical dimension by δ=4.01 degrees, end reflector 225 may be tilted by an angle ω=1.31 degrees. For an emission path of display light 125 that is obliquely angled down in the vertical dimension by δ=7.12 degrees, end reflector 225 may be tilted by an angle ω=2.3 degrees. Of course, other tilt angles may be implemented for ω.

In the illustrated embodiment, partially reflective surface 275 is implemented as a non-polarization selective beam splitter (e.g., 50/50 beam splitter). In order to achieve an emission path of display light 125 that is obliquely angled left or right in the horizontal dimension, partially reflective surface 275 is obliquely angled relative to eye-ward side 271 with an offset from 45 degrees. For example, the angle φ between eye-ward side 271 and partially reflective surface 275 may be φ=43 degrees to achieve an angle θ=6 degrees tilt relative to normal vector 140 in the horizontal dimension. This tilt allows the display module end of eyepiece 200 to be toed-in towards the user's temple by 6 degrees while permitting the user to look straight forward to see display light 125. Angling partially reflective surface 275 in the opposite direction past 45 degrees would permit the display module end of eyepiece 200 to be toed-out. Of course, other tilt angles may be implemented for φ. In other embodiments, partially reflective surface 275 may be implemented as a polarizing beam splitter ("PBS").

Figure 3:
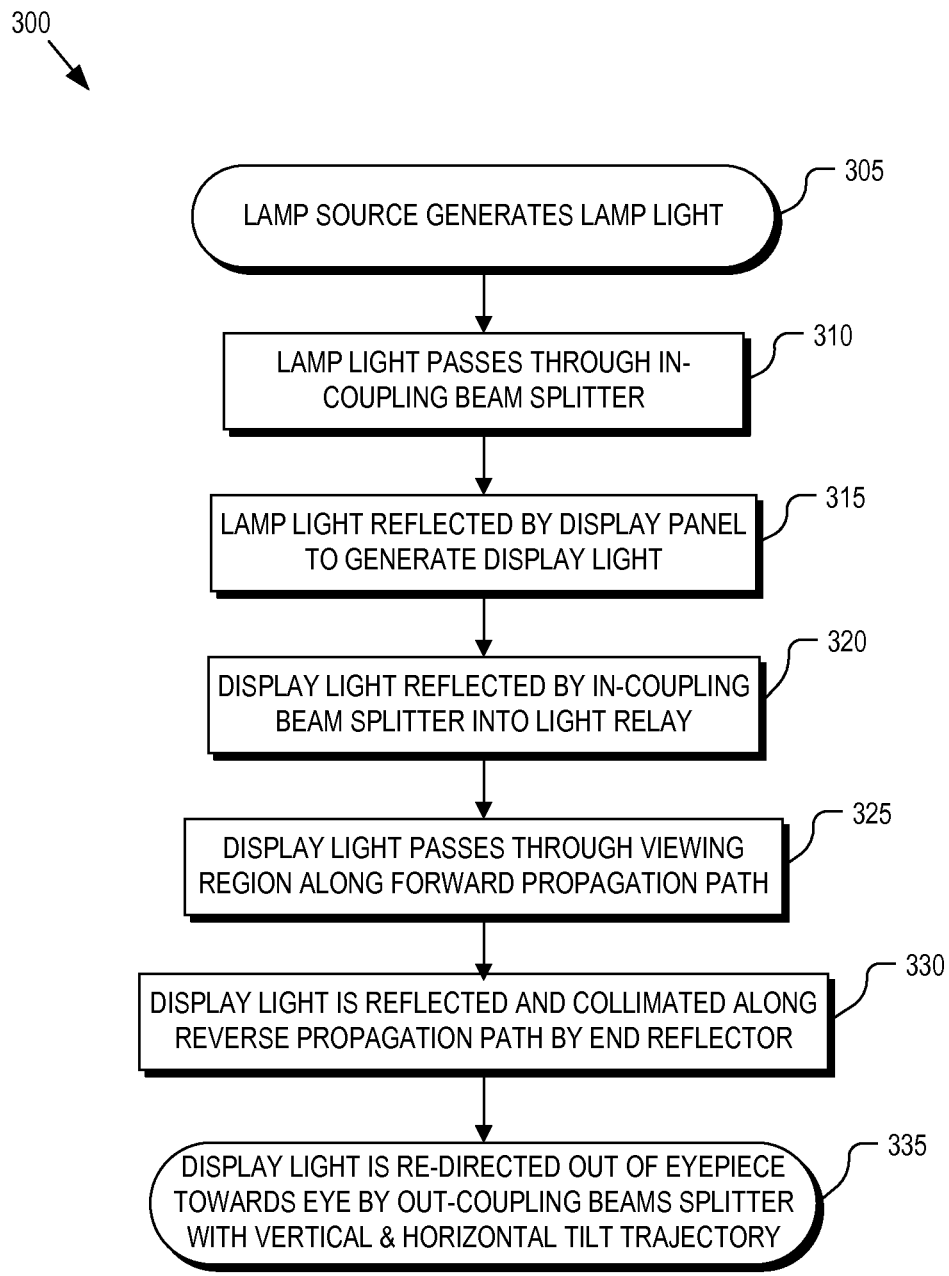
FIG. 3 is a flow chart illustrating a process of operation of an eyepiece that outputs display light along a dual tilted emission path, in accordance with an embodiment of the disclosure.

FIG. 3 is a flow chart illustrating a process 300 of operation of eyepiece 200, in accordance with an embodiment of the disclosure. Process 300 is described with reference to FIGS. 2A-C. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, lamp source 230 generates lamp light used to illuminate display panel 240, which modules image data onto the lamp light to create display light 125. At least a portion of the lamp light passes through in-coupling beam splitter 235 to illuminate display panel 240 (process block 310). In one embodiment, in-coupling beam splitter 235 is a polarizing beam splitter ("PBS") cube that substantially passes light of a first polarization (e.g., 85% of P polarization), while substantially reflecting light of a second polarization (e.g., 99% of S polarization). These two polarization components are typically orthogonal linear polarizations. The emitted light may be pre-polarized (e.g., P polarized) or unpolarized light. In either event, the P polarization component passes through in-coupling beam splitter 235 to illuminate display panel 240 while most of any remaining portions of S polarization are reflected back onto light absorbing coating 245 (e.g., flat black paint). Thus, in the illustrated embodiment, display panel 240 is mounted in opposition to lamp source 230 with in-coupling beam splitter 235 disposed in between. In other embodiments (not illustrated), display panel 240 and light absorbing coating 245 can swap locations.

Display panel 240 (e.g., liquid crystal on silicon panel (LCOS), digital micro-mirror display, etc.) imparts image data onto the lamp light via selective reflection by an array of reflective pixels (process block 315). In an embodiment using an LCOS panel, reflection by display panel 240 rotates the polarization of the incident lamp light by 90 degrees. Upon reflection of the incident lamp light, display light 125 (which has been rotated in polarization by 90 degrees to be, for example, S polarized) is re-directed by in-coupling beam splitter 235 and propagates down light relay section 210 along a forward propagation path towards viewing region 215 (process block 320). As display light 125 passes through linear polarizer 220, any remaining components of P polarization are substantially absorbed. In an embodiment using a digital micro-mirror display, in-coupling beam splitter 235 may be implemented as a standard 50/50 non-polarizing beam splitter, display light 125 may be unpolarized light, and linear polarizer 220 may be omitted.

In the illustrated embodiment, display light 125 is directed along the forward propagation path within light relay section 210 without need of total internal reflection ("TIR"). In other words, the cross sectional shape and divergence of the light cone formed by display light 125 is confined such that the light rays reach end reflector 225 without need of TIR off the sides of light relay section 210.

In-coupling beam splitter 235, light relay section 210, and viewing region 215 may be fabricated of a number of materials including glass, optical grade plastic, fused silica, PMMA, Zeonex-E48R, or otherwise. The length of light relay section 210 may be selected based upon the temple-eye separation of the average adult and such that the focal plane of end reflector 225 substantially coincides with an emission aperture of display panel 240. To achieve focal plane alignment with the emission aperture of display panel 240, both the length of light relay section 210 and the radius of curvature of end reflector 225 may be selected in connection with each other.

The illustrated embodiment of light relay section 210 includes light blocks 260 disposed on the edges of large section 265 that extend past small section 250. Light blocks 260 reduce external light from leaking into light relay section 210. Light blocks 260 may be opaque paint, a opaque collar extending around small section 250, or otherwise. In other embodiments, light relay section 210 may not include a small section 250, rather the entire length of light relay section 210 may have a continuous sloped cross-section or a constant size cross-section as opposed to an abrupt step at the junction between large and small cross-sections.

In a process block 325, display light 125 passes across viewing region 215 and through partially reflective surface 275. Of course, in an embodiment where partially reflective surface 275 is a 50/50 beam splitter, half of the light is transmitted through to end reflector 225 while the other half is reflected out external scene side 274. In an embodiment where partially reflective surface 275 is a PBS (not illustrated), a half-wave plate polarization rotator may be included between display module 205 and partially reflective surface 275 and a quarter-wave plate polarization rotator may be included between partially reflective surface 275 and end reflector 225.

In a process block 330, display light 125 is reflected back along the reverse propagation path by end reflector 225. In one embodiment, end reflector 225 is a concave reflector and has a shape to substantially collimate display light 125 reflected along the reverse propagation path. Collimating the display light has an effect of virtually displacing the display image at or near infinity thereby helping the human eye 101 to bring the display image into focus in a near-to-eye configuration. Of course, end reflector 225 may reduce the divergence without fully collimating the light, thereby displacing the virtual image at a location less than infinity (e.g., 1 to 3 meters).

In a process block 335, display light 125 travelling along the reverse propagation path is reflected by partially reflective surface 275 and redirected out of eyepiece 200 through eye-ward side 271 towards eye 101. In the illustrated embodiment, since partially reflective surface 275 is a 50/50 beam splitter, only a portion of display light 125 is reflected out of eyepiece 200 along the emission path while another portion passes through partially reflective surface 275 back towards display module 205. This undesirable back reflection portion can cause ghosting effects visible by the user. Accordingly, in one embodiment, display panel 240 is tilted or rotated by angle ϕ (see FIG. 2C) relative to eye-ward side 271 to reduce or eliminate the ghosting effect (discussed in greater detail in connection with FIG. 5). In one embodiment, display panel 240 is titled by angle ϕ=1 degree±0.5 degrees. Of course, other tilting angles for angle ϕ about other axes than illustrated in FIG. 2C may be implemented. Furthermore, the tilting of end reflector 225 serves an additional purpose of shifting the back reflected display light 125 off-axis to further accentuate misalignment by the time the back reflected image light reaches display panel 240 (discussed in greater detail in connection with FIG. 5) thereby reducing deleterious ghosting.

Both end reflector 225 and partially reflective surface 275 are rotated or tilted to perform the dual axis light bending internal to eyepiece 200. It is noteworthy that the rotation angles ϕ and ω are smaller than the light bending that results in the emission path outside of eyepiece 200 due to the additional refractive bending that occurs when display light 125 exits through eye-ward side 271.

FIGS. 4A-C illustrate various views of a component 400 for reflecting display light out of an eyepiece along a dual tilted emission path, in accordance with an embodiment of the disclosure. Component 400 includes partially reflective surface 405 and end reflector 410 and is one example for implementing one of the two pieces of viewing region 215 and light relay section 210 illustrated in FIG. 2A.

Partially reflective surface 405 may be implemented as a non-polarizing beam splitter (e.g., 50/50 beam splitter), such as a thin layer of silver, or a polarizing beam splitter, such as a multi-layer thin film structure. The illustrated embodiment of end reflector 410 is a concave surface coated with a reflective material, such as metal (e.g., silver). Reflective surface 405 is obliquely oriented relative to eye-ward side 471 by angle ϕ and controls horizontal tilt of the emission path in the horizontal plane. In particular, reflective surface 405 is offset from 45 degrees. For example, reflective surface 405 may be offset by 2 degrees such that angle ϕ=43 degrees, which results in 6 degrees of horizontal tilting of the emission path of the display light. Of course, other oblique angles for ϕ may be implemented.

In one embodiment, end reflector 405 is tilted or rotated clockwise about axis 415 by an angle ω. The rotation of end reflector 405 about axis 415 results in a vertical tilt of the emission path. As discussed above, for an emission path angled down in the vertical dimension by δ=4.01 degrees, end reflector 410 may be tilted by an angle ω=1.31 degrees. For an emission path of display light 125 that is obliquely angled down in the vertical dimension by δ=7.12 degrees, end reflector 225 may be tilted by an angle ω=2.3 degrees. Of course, other tilt angles may be implemented for ω.

Figure 5:
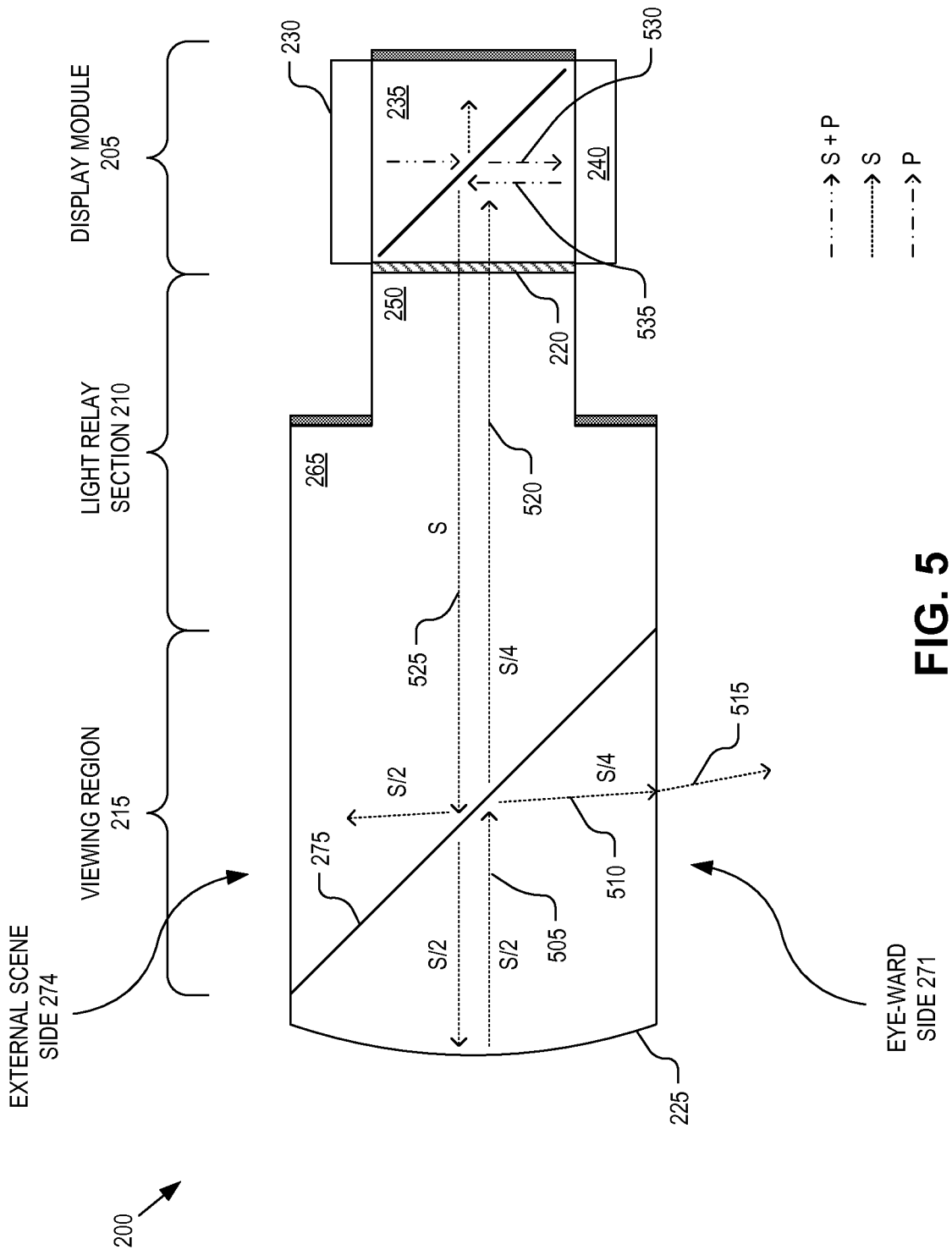
FIG. 5 illustrates how the eyepiece reduces ghost images, in accordance with an embodiment of the disclosure.

FIG. 5 illustrates how eyepiece 200 reduces ghost images by rotating display panel 240 by angle φ (see FIG. 2C), in accordance with an embodiment of the disclosure. As discussed above in connection with process 300 and FIG. 3, a portion 505 of display light 125 is back reflected by end reflector 225. Due to the tilting of end reflector 225, the back reflected portion 505 is shifted off-axis. When portion 505 reaches partially reflective surface 275, a portion 510 is redirected out of eyepiece 200 along a dual tilted emission path 515 while a portion 520 passes through partially reflective surface 275 and continues back to display module 230. Back reflected portion 520 is S polarized at about a quarter intensity of the portion 525 originally travelling along the forward propagation path. Since portion 520 is S polarized it passes through linear polarizer 220 and is reflected off in-coupling beam splitter 235 as portion 530 onto display panel 240. The off-pixels within display panel 240 reflect portion 530 without affecting polarizing, while the on-pixels rotate the polarization by 90 degrees. Thus, some of the back reflected light within portion 535 is S-polarized and once again directed down eyepiece 200 along the forward propagation path, potentially resulting in a deleterious ghost image seen by the user. Accordingly, rotating display panel 240 by a couple degrees (e.g., 1 degree±0.5 degrees), along with the tilting of end reflector 225, provides enough off-axis shift of the ghost image to prevent the ghost image from reaching the user's vision. It is noteworthy that the tilting of end reflector 225 provides double the off-axis shifting since both the original display image and the ghost image are both shifted at each back reflection, which in connection with the tilting of display panel 240 provides adequate off-axis shift to block the ghosting image from reaching the user's eye when reflecting off partially reflective surface 275.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece, comprising:
   a display module for providing display light along a forward propagation path within the eyepiece;
   a concave end reflector disposed at an opposite end of the eyepiece from the display module to reflect the display light back along a reverse propagation path within the eyepiece; and
   a viewing region disposed between the display module and the concave end reflector and including a partially reflective surface, the partially reflective surface to redirect at least a portion of the display light traveling along the reverse propagation path out of an eye-ward side of the eyepiece along an emission path,
   wherein the partially reflective surface is obliquely angled with an offset from 45 degrees relative to the eye-ward side to cause the emission path to have a first oblique angle in a horizontal dimension relative to a first normal vector of the eye-ward side,
   wherein the concave end reflector is tilted such that a second normal vector from a center point of the concave end reflector is obliquely angled relative to a top or bottom surface of the eyepiece to cause the emission path to have a second oblique angle in a vertical dimension relative to the first normal vector of the eye-ward side,
   wherein the horizontal dimension is orthogonal to the vertical dimension, the vertical dimension intersects through the top and bottom surfaces of the eyepiece, and the horizontal dimension intersects through the display module and the concave end reflector.

2. The eyepiece of claim 1, wherein the top and bottom surfaces are flat and planar.

3. The eyepiece of claim 2, wherein the eye-ward side of the eyepiece is flat and planar and substantially perpendicular to the top and bottom surfaces.

4. The eyepiece of claim 3, wherein the eyepiece is configured to be coupled to a head mounted display that holds the eyepiece level above an eye of a user and angles an end of the eyepiece proximate to the display module towards a temple region of the user such that the user looks straight forward and up to align the eye with the emission path of the display light.

5. The eyepiece of claim 4, wherein the first oblique angle is 6 degrees ±3 degrees, the offset from 45 degrees of the partially reflective surface is 2 degrees ±1 degree, the second oblique angle is 7 degrees ±3 degrees, and the second normal vector from the center point of the concave end reflector is obliquely angled relative to the top or bottom surface of the eyepiece by 2 degrees ±1 degree.

6. The eyepiece of claim 1, wherein the display module comprises:
   a lamp source to generate lamp light; and
   a display panel positioned to be illuminated by the lamp light and to selectively reflect the lamp light as the display light,
   wherein the display panel is tilted to reduce ghost images due to back reflections of the display light reaching the display panel.

7. The eyepiece of claim 6, wherein the display panel is tilted to be obliquely angled relative to the eye-ward side of the eyepiece.

8. The eyepiece of claim 7, wherein the display panel is tilted clockwise about an axis that is substantially parallel to an axis that extends from the display module to the concave end reflector and is substantially parallel to the eye-ward side.

9. The eyepiece of claim 6, wherein the display module further comprises:
   an in-coupling beam splitter disposed between the lamp source and the display panel to redirect the display light received from the display panel along the forward propagation path within the eyepiece.

10. The eyepiece of claim 9, wherein the in-coupling beam splitter comprises a polarizing beam splitter, the eyepiece further comprising: a light relay section coupled between the viewing region and the display module through which the forward propagation path extends;
   a linear polarizer disposed within the forward propagation path between the display module and the partially reflective surface, wherein the linear polarizer is oriented to filter out a first linear polarization that is substantially passed through the in-coupling beam splitter and to pass a second linear polarization that is substantially reflected by the in-coupling beam splitter.

11. The eyepiece of claim 10, wherein the light relay section has first section with a first cross-section size that coupled to the display module and a section with a second cross-section size larger than the first cross-section size that extends to the viewing region.

12. The eyepiece of claim 11, wherein the light relay section and the viewing region of the eyepiece are made of two plastic pieces with oblique mating interfaces between which the partially reflective surface is disposed.

13. A head mounted display ("HMD") for providing display light to an eye of a user, the HMD comprising:
an eyepiece including:
a display module for generating display light;
a concave end reflector disposed at an opposite end of the eyepiece from the display module; and
a viewing region disposed between the display module and the concave end reflector and including a partially reflective surface, the partially reflective surface to pass at least a portion of the display light traveling along a forward propagation path and to redirect at least a portion of the display light traveling along the reverse propagation path out of an eye-ward side of the eyepiece along an emission path;
a frame assembly to support the eyepiece for wearing on a head of the user with the viewing region positioned above the eye of the user,
wherein the partially reflective surface is obliquely angled with an offset from 45 degrees relative to the eye-ward side to cause the emission path to have a first oblique angle in a horizontal dimension relative to a first normal vector of the eye-ward side,
wherein the concave end reflector is tilted such that a second normal vector from a center point of the concave end reflector is obliquely angled relative to a top or bottom surface of the eyepiece to cause the emission path to have a second oblique angle in a vertical dimension relative to the first normal vector of the eye-ward side,
wherein the horizontal dimension is orthogonal to the vertical dimension, the vertical dimension intersects through the top and bottom surfaces of the eyepiece, and the horizontal dimension intersects through the display module and the concave end reflector.

14. The HMD of claim 13, wherein the eye-ward side of the eyepiece is flat and planar and substantially perpendicular to the top and bottom surfaces.

15. The HMD of claim 14, wherein the frame assembly is configured to hold the eyepiece level above an eye of a user and angles an end of the eyepiece proximate to the display module towards a temple region of the user such that the user looks straight forward and up to align the eye with the emission path of the display light.

16. The HMD of claim 13, wherein the display module comprises:
a lamp source to generate lamp light; and
a display panel positioned to be illuminated by the lamp light and to selectively reflect the lamp light as the display light,
wherein the display panel is tilted to reduce ghost images due to back reflections of the display light reaching the display panel.

17. The HMD of claim 16, wherein the display panel is tilted to be obliquely angled relative to the eye-ward side of the eyepiece.

18. The HMD of claim 17, wherein the display panel is tilted clockwise about an axis that is substantially parallel to an axis that extends from the display module to the concave end reflector and is substantially parallel to the eye-ward side.

19. The HMD of claim 16, wherein the display module further comprises an in-coupling beam splitter,
wherein the in-coupling beam splitter comprises a polarizing beam splitter, the eyepiece further comprising: a light relay section coupled between the viewing region and the display module through which the forward propagation path extends;
a linear polarizer disposed within the forward propagation path between the display module and the partially reflective surface, wherein the linear polarizer is oriented to filter out a first linear polarization that is substantially passed through the in-coupling beam splitter and to pass a second linear polarization that is substantially reflected by the in-coupling beam splitter.

20. The HMD of claim 19, wherein the light relay section and the viewing region of the eyepiece are made of two plastic pieces with oblique mating interfaces between which the partially reflective surface is disposed.

* * * * *